United States Patent
Noel et al.

(10) Patent No.: US 7,141,256 B2
(45) Date of Patent: *Nov. 28, 2006

(54) PACKAGING FILM HAVING PERMEABLE PATCH COVERING AN OPENING IN THE FILM AND PACKAGE MADE THEREFROM

(75) Inventors: David C. Noel, Greer, SC (US);
Charles R. Barmore, Moore, SC (US);
H. Walker Stockley, III, Spartanburg, SC (US); E. Susanne Troutt, Spartanburg, SC (US)

(73) Assignee: Cryovac Inc., Duncan, SC (US)

( * ) Notice: Subject to any disclaimer, the term of this patent is extended or adjusted under 35 U.S.C. 154(b) by 656 days.

This patent is subject to a terminal disclaimer.

(21) Appl. No.: 10/346,522

(22) Filed: Jan. 17, 2003

(65) Prior Publication Data

US 2003/0134013 A1    Jul. 17, 2003

Related U.S. Application Data

(60) Continuation of application No. 08/828,903, filed on Apr. 2, 1997, now Pat. No. 6,667,067, which is a division of application No. 08/471,065, filed on Jun. 6, 1995, now Pat. No. 5,686,126.

(51) Int. Cl.
*B65D 85/00* (2006.01)
(52) U.S. Cl. ............... 426/127; 426/118; 426/396; 426/415; 426/129; 428/43; 428/172; 428/304.4; 206/484; 206/484.1
(58) Field of Classification Search ............ 426/127, 426/118, 129, 396, 415; 428/172, 43, 304.4; 206/484, 484.1, 484.2
See application file for complete search history.

(56) References Cited

U.S. PATENT DOCUMENTS

| 1,042,119 A | 10/1912 | Kavanagh |
| 2,260,064 A | 10/1941 | Stokes ............... 93/3 |
| 2,623,826 A | 12/1952 | Grinstead ............ 99/174 |

(Continued)

FOREIGN PATENT DOCUMENTS

DE    2 240 234    8/1971

(Continued)

OTHER PUBLICATIONS

Japanese Abstract, JP 920233770, Lid material for gas packaging filled with inert gas for meat—composed of a low barrier film contg., e.g. LDPE . . .

*Primary Examiner*—Milton I. Cano
*Assistant Examiner*—Adepeju O. Pearse
(74) *Attorney, Agent, or Firm*—Thomas C. Lagaly

(57) ABSTRACT

A package, which allows for butchering and packaging of fresh red meat at a centralized facility is provided which includes an impermeable tray supporting the product, a first film sealed to the tray for enclosing the product, a channel defined within the first film for exchanging gases into and out of the package, and a second impermeable film enclosing the first film, such that removal of the impermeable film provides for the exchange of gases into and out of the package. The channel for exchanging of gases may be perforations defined within the first film, a second highly permeable film sealed to the first film, or an enlarged opening formed within the first film, which is enclosed with a patch following adequate gas exchange at retail. Such gas exchange is required to release any low oxygen atmosphere and allow for the introduction of oxygen to the packaged meat product. The channel for exchanging gases having a gas transmission rate of at least about 50,000 cc/m²/24 hrs./atm. at 73° F.

15 Claims, 7 Drawing Sheets

U.S. PATENT DOCUMENTS

| | | | |
|---|---|---|---|
| 2,814,381 A | 11/1957 | Stevick | 206/45 |
| 2,925,346 A | 2/1960 | Harper et al. | 99/174 |
| 3,019,573 A | 2/1962 | Navikas | 53/27 |
| 3,074,798 A | 1/1963 | Palmer | 99/174 |
| 3,360,382 A | 12/1967 | Miller | 99/174 |
| 3,561,668 A | 2/1971 | Bergstrom | 229/43 |
| 3,574,642 A | 4/1971 | Weinke | 99/174 |
| 3,681,092 A | 8/1972 | Tichenal et al. | 99/174 |
| 3,713,849 A | 1/1973 | Grindrod et al. | 99/174 |
| 3,716,180 A | 2/1973 | Bemiss et al. | 299/13 |
| 3,783,089 A | 1/1974 | Hurst et al. | 161/166 |
| 3,808,394 A | 4/1974 | Mominee et al. | 219/121 |
| 3,843,806 A | 10/1974 | Kishpaugh et al. | 426/106 |
| 4,055,672 A | 10/1977 | Hirsch et al. | 426/127 |
| 4,264,392 A | 4/1981 | Watt | 156/272 |
| 4,438,850 A | 3/1984 | Kahn | 206/634 |
| 4,490,145 A | 12/1984 | Campbell | 604/333 |
| 4,522,835 A | 6/1985 | Woodruff et al. | 426/264 |
| 4,590,078 A | 5/1986 | Umina | 426/113 |
| 4,634,614 A | 1/1987 | Holzner | 428/35 |
| 4,667,814 A | 5/1987 | Wakamatsu et al. | 206/0.7 |
| 4,700,531 A | 10/1987 | Hsu et al. | 53/412 |
| 4,816,027 A | 3/1989 | Gilchrist et al. | 604/339 |
| 4,840,271 A | 6/1989 | Garwood | 206/213 |
| 4,842,875 A | 6/1989 | Anderson | 426/118 |
| 4,847,148 A | 7/1989 | Schirmer | 428/332 |
| 4,886,372 A | 12/1989 | Greengrass et al. | 383/100 |
| 4,886,690 A | 12/1989 | Davis et al. | 428/36.6 |
| 4,889,731 A | 12/1989 | Williams, Jr. | 426/106 |
| 4,901,505 A | 2/1990 | Williams, Jr. | 53/412 |
| 4,910,033 A | 3/1990 | Bekele et al. | 426/129 |
| 5,045,331 A | 9/1991 | Antoon, Jr. | 426/118 |
| 5,079,059 A | 1/1992 | Wyslotsky | 428/43 |
| 5,132,151 A | 7/1992 | Graney | 428/40 |
| 5,226,531 A | 7/1993 | Garwood | 206/213 |
| 5,296,291 A | 3/1994 | Mueller | 428/349 |
| 5,316,607 A | 5/1994 | Johnsen et al. | 156/212 |
| 5,341,930 A | 8/1994 | Counts et al. | 206/459.5 |
| 5,346,735 A | 9/1994 | Logan et al. | 428/36.7 |
| 5,348,752 A | 9/1994 | Gorlich | 426/129 |
| 5,402,622 A | 4/1995 | Stockley, III et al. | 53/427 |
| 5,419,096 A | 5/1995 | Gorlich | 53/432 |
| 5,419,097 A | 5/1995 | Gorlich et al. | 53/432 |
| 5,423,782 A | 6/1995 | Wolrich | 604/339 |
| 5,439,132 A | 8/1995 | Gorlich | 220/359 |
| 5,492,705 A | 2/1996 | Porchia et al. | 426/106 |
| 5,518,790 A | 5/1996 | Huber et al. | 428/35.2 |
| 5,545,154 A | 8/1996 | Oberholtzer | 604/336 |
| 5,560,182 A | 10/1996 | Garwood | 53/432 |
| 5,591,144 A | 1/1997 | Smith et al. | 604/327 |
| 5,672,163 A | 9/1997 | Ferreira et al. | 604/333 |
| 5,686,126 A | 11/1997 | Noel et al. | 426/127 |
| 5,686,127 A | 11/1997 | Stockley, III et al. | 426/129 |
| 5,722,965 A | 3/1998 | Kuczynski | 604/344 |
| 5,759,650 A | 6/1998 | Raines et al. | 428/35.7 |
| 5,785,695 A | 7/1998 | Sato et al. | 604/339 |
| 6,667,067 B1 * | 12/2003 | Noel et al. | 426/127 |

FOREIGN PATENT DOCUMENTS

| | | |
|---|---|---|
| DE | 38 31 234 A1 | 9/1988 |
| EP | 0 261 930 | 9/1987 |
| EP | 0 270 764 | 10/1987 |
| EP | 6 698 563 A1 | 8/1995 |
| EP | 0 721 899 | 1/1996 |
| EP | 0 769 454 A1 | 9/1996 |
| FR | 2 323 594 | 9/1975 |
| GB | 2 251 540 | 1/1991 |
| WO | 87/02965 | 11/1985 |
| WO | 87/02965 | 5/1987 |
| WO | 90/01005 | 2/1990 |
| WO | 96/15903 | 5/1996 |
| WO | 96/39341 | 12/1996 |

* cited by examiner ously with the development of peelable films. That is, films have been developed which readily delaminate into permeable and impermeable portions. Such a film is sealed to a support member, such as a tray, which contains the meat product, thereby forming a gas impermeable package for distribution. At the retail outlet, the gas impermeable portions are peeled from the film leaving a permeable film sealed to the tray and, therefore, a gas permeable package which allows the meat to bloom to bright red because of the exchange with atmospheric oxygen.

PACKAGING FILM HAVING PERMEABLE PATCH COVERING AN OPENING IN THE FILM AND PACKAGE MADE THEREFROM

BACKGROUND OF THE INVENTION

This application is a continuation of application Ser. No. 08/828,903, filed Apr. 2, 1997 and now U.S. Pat. No. 6,667,067, which is a division of application Ser. No. 08/471,065, filed Jun. 6, 1995 and now U.S. Pat. No. 5,686,126.

The present invention relates generally to packages for fresh red meat. Particularly, this invention is directed to the packaging of food products such that the packaged product may be maintained in one condition under certain circumstances and then converted to another condition. Specifically, packages in accordance with the present invention provide for distribution of a packaged product in a low oxygen environment and for introduction of oxygen to the product surface at a supermarket or other retail outlet. Such introduction of oxygen is achieved either by permeation of oxygen through a film in contact with the product surface or through an exchange of atmospheric oxygen with a low oxygen gaseous atmosphere contained around the product.

While a wide variety of food products can be packaged in accordance with the teachings of this invention, it is particularly advantageous in connection with the packaging of fresh red meat such that the meat may be transported in a low oxygen atmosphere, that is, preferably 0.5% $O_2$ or less, most preferably 0.05% $O_2$ or less, and then caused to bloom when it reaches a supermarket by exposure to oxygen.

Historically, large sub-primal cuts of meat have been butchered and packaged in each supermarket. This, however, can be inefficient and result in certain undesirable additional costs. For example, all cuts from a large sub-primal must be sold at once. Instead it would be preferable to permit the meat to be butchered and packaged at a central facility which benefits from economies of scale and thereafter shipped to individual supermarkets such as is done, for example, with many poultry products.

In the past, the goal of central fresh red meat processing has not been achievable because most consumers prefer to buy meat which is reddened in color as a result of exposure to oxygen. However, the meat maintains its reddened color for approximately one to three days and, thereafter, turns a brown color which is undesirable to most consumers.

Therefore, if the meat was butchered and packaged in a gas permeable (hereinafter "permeable") film, as is typical at retail, at a central location and then shipped to another location for eventual sale, in all likelihood, by the time the package reached the retail outlet the meat would have undergone the transformation to the brown color and would be effectively unsalable. Conversely, if the meat was butchered and packaged at a central location in a gas-impermeable (hereinafter "impermeable") film, either under vacuum or with vacuum and a low oxygen gas flush, and then shipped to another location for eventual sale, the meat would reach the retail outlet having a purple color which is typical of meat prior to exposure to oxygen. Heretofore, marketing efforts to teach the consumer about the harmlessness of the purple color have proved to be difficult. And, if the gas impermeable film was a component of a conventional package having a tray which is overwrapped or lidded with a film and which contains a low oxygen atmosphere, the impermeable film would have to be removed and replaced with a permeable film in order to allow for bloom of the meat to a bright red color prior to display for the consumer, negating to a large extent the benefits of a central processing facility.

A variety of packages have been developed in an effort to provide a means for transporting meat in a low oxygen environment and for quickly and easily introducing oxygen to the meat at the retail outlet immediately prior to display to the consumer.

One approach to solving this problem has involved the development of peelable films. That is, films have been developed which readily delaminate into permeable and impermeable portions. Such a film is sealed to a support member, such as a tray, which contains the meat product, thereby forming a gas impermeable package for distribution. At the retail outlet, the gas impermeable portions are peeled from the film leaving a permeable film sealed to the tray and, therefore, a gas permeable package which allows the meat to bloom to bright red because of the exchange with atmospheric oxygen.

The peelable film may extend over the contained product and be sealed to the periphery of the tray as a lid or it may be heated and draped over the product under vacuum to form to a vacuum skin package. However, for both types of packages the principal drawback is the relatively low gas transmission rate of the permeable film portion after removal of the impermeable portion. That is, although the permeable portion of the peelable film has a much higher gas transmission rate than that of the entire film prior to delamination, 5,000 to 25,000 cc/m$^2$/24 hrs./atm. at 73° F. a compared to 0 to 50 cc/m$^2$/24 hrs./atm. at 73° F. prior to delamination, it is still too low to effect bloom of the packaged meat in a low oxygen gaseous atmosphere in a short period of time, except in areas of intimate permeable film to meat contact.

Most of the other approaches to achieving the goal of central fresh red meat processing have involved the development of a variety of dual web packages of the type having a permeable film covering the meat product and an impermeable film, which is removed at the retail outlet, covering the permeable film wherein the permeable film and the impermeable film are separate, discreet films.

Examples of these types of packages include dual overwrap packages wherein a permeable film is wrapped around the meat and its support member and an impermeable film is wrapped about the permeable film; dual lid packages which include a permeable lid and an impermeable lid sealed to the periphery of the support member; and packages with a head space which allows for the introduction of a treating gas, typically nitrogen, carbon dioxide or some mixture of the two, between a permeable film adjacent to the meat product and an impermeable upper web. But, as is the case with the peelable films discussed above, each of these dual web packages are limited in their effectiveness by the permeability of the permeable film. Typical gas transmission rates for commercially viable gas permeable films are 5,000 to 25,000 cc/m$^2$/24 hrs./atm. at 73° F. which is too low to effect rapid red meat bloom by exchange of the low oxygen gas and/or gases out and the atmospheric oxygen in.

A further package developed to allow for central fresh red meat processing includes a gas impermeable upper lid with a valve defined in the lid. The package may include a treating gas between the packaged meat and the upper lid during distribution which is withdrawn through the valve and replaced with an oxygen-rich gas. Although a rapid bloom is possible with this system, it has the disadvantages of requiring trained operators at the retail outlet and relatively expensive equipment to exchange each package thus negating the cost savings of a central processing facility. The presence of the valve has the further disadvantage of creating a package appearance which is different from that which consumers are accustomed to seeing for meat packaging. Further, a gas space between the meat product and the impermeable film is required to maintain a bloomed color which yields an underfilled package appearance.

Yet another package developed to allow for central fresh red meat processing provides for an excellent exchange of gases and rapid introduction of oxygen in which an upper impermeable web covers a lower permeable web which includes unsealed areas in the seal of the permeable web to the tray. However, the intermittent sealed and nonsealed areas are formed by an altered sealing head which comprises a series of sealing "fingers" rather than a conventional, continuous sealing surface.

Thus, it is an object of the present invention to provide a package which allows for central processing of fresh red meat with minimal processing required at retail.

It is yet another object of the present invention to provide a package which is similar in appearance to that which consumers are accustomed to seeing for meat packaging.

It is a further object of the present invention to provide a package which allows for rapid bloom of fresh red meat.

It is yet another object of the present invention to provide a package which may be assembled, filled and sealed at a central processing facility on conventional equipment.

SUMMARY OF THE INVENTION

These as well as other objects are achieved by providing a package for a product which includes a product, an impermeable support member supporting the product, a first film sealed to the support member for enclosing the product, means defined within the first film for exchanging gases into and out of the package, such means for exchanging gases having a gas transmission rate of at least about 50,000 $cc/m^2/24$ hrs./atm. at 73° F., and a second impermeable film enclosing the first film and the means defined therein for exchanging gases, such that removal of the second impermeable film provides for the exchange of gases into and out of the package.

Such objects are further achieved by providing a package for a product which includes a product, an impermeable support member supporting the product, a multilayer web sealed to the support member for enclosing the product, the multilayer web being delaminatable into a permeable portion and an impermeable portion with the permeable portion being directly adjacent and sealed to the support member and the impermeable portion, whereby the permeable portion remains sealed to the support member upon delamination of the impermeable portion therefrom, and whereby delamination of the impermeable portion from the permeable portion defines at least one channel within the permeable portion allowing for a free flow of gases through the at least one channel, into and out of the package.

Such objects are also achieved by providing a package for a product which includes a product, a support member supporting the product, a first film sealed to the support member for enclosing the product, a second, impermeable film for enclosing the first film, at least one channel defined within the first film and enclosed by the second, impermeable film whereby removal of the second, impermeable film allows for a free flow of gases through the at least one channel, into and out of said package, and a patch for enclosing the channel after the gases flowing into and out of the package have achieved a desired equilibrium.

Such objects are further achieved by providing a package for a product which includes a product, a support member supporting the product, a first film sealed to the support member, a second film sealed to the first film, the second film having a gas transmission rate of at least about 50,000 $cc/m^2/24$ hrs./atm. at 73° F., the product being enclosed within the support member by the first and second films, a third, impermeable film for enclosing the first and second films, whereby removal of the third, impermeable film allows for a free flow of gases through the second film, into and out of the package.

BRIEF DESCRIPTION OF THE DRAWINGS

A detailed description of preferred embodiments of the invention follows, with reference to the accompanying drawings, wherein.

DETAILED DESCRIPTION OF THE PREFERRED EMBODIMENTS

The present invention is directed to a tray-type package suitable for the central processing of fresh red meat which includes a gas impermeable (hereinafter "impermeable") support member or tray, a first film sealed to the tray which includes a means defined therein for providing for an exchange of gases into and out of the package, and an impermeable film which encloses the first film and means for exchanging gases defined therein. The package most preferably contains a low oxygen gaseous atmosphere such as, for example, a nitrogen/carbon dioxide mix. Thus, removal of the impermeable film allows for a release of the low oxygen atmosphere and for introduction of oxygen to the packaged meat product.

The means for exchanging gases defined within the first film may be perforations defined within the first film which are exposed upon removal of the impermeable film, an enlarged opening defined within the first film which is exposed upon removal of the impermeable film and is covered with a patch or label following a period of time adequate for sufficient exchange of gases, or a highly permeable film, sealed to the first film, which provides an area of exceptionally high gas transmission upon removal of the impermeable film.

Looking to the first group of packages, FIGS. 1 through 4 illustrate packages having a variety of multilayer webs which may be delaminated into impermeable upper webs and perforated lower webs. Such multilayer webs allow for a simplified packaging operation employing conventional single flange trays, a vacuum or, preferably, a vacuum and gas flush with a low oxygen atmosphere, and sealing of a single web to the tray flange in a single sealing step. At retail, the upper layer of the web is peeled away revealing a perforated lower layer which has a gas transmission rate of at least about 50,000 cc/m$^2$/24 hrs./atm. at 73° F., allowing for a rapid release of the low oxygen atmosphere and introduction of oxygen for immediate blooming of the packaged meat product. Following blooming, the package may optionally be overwrapped with a gas permeable film such as is employed in conventional retail overwrapping to act as a dust cover for the packaged meat product.

Figure 1:
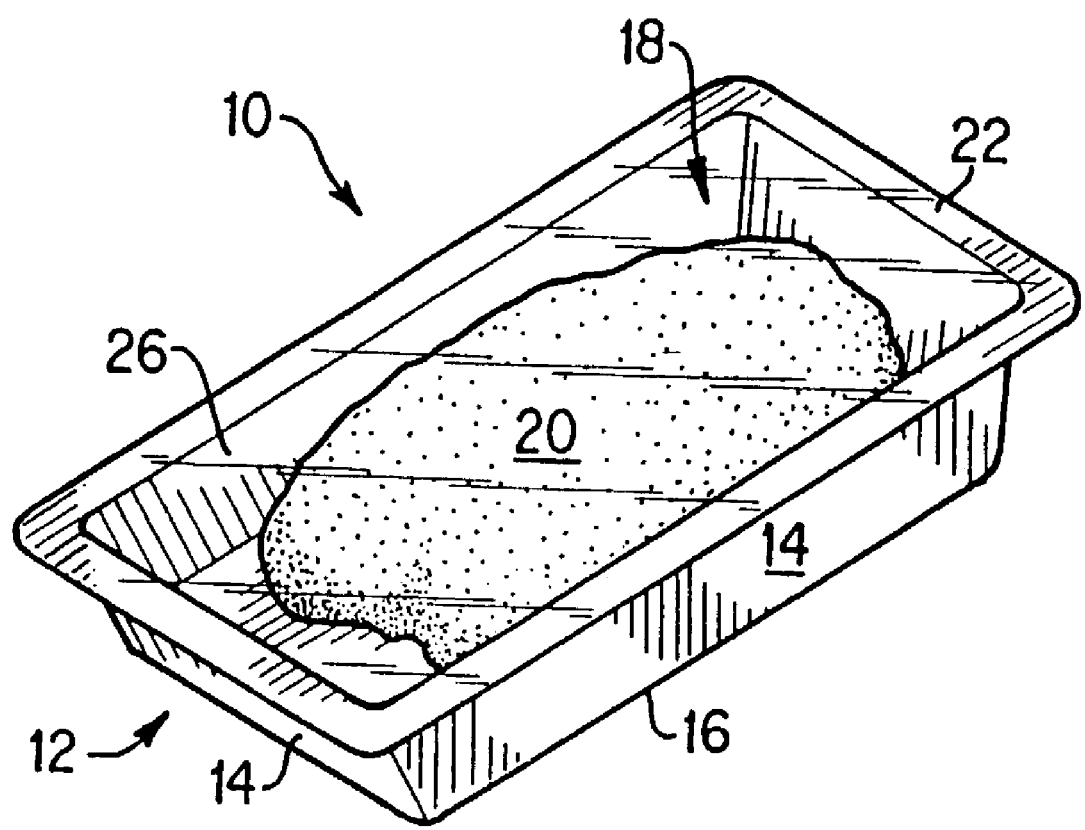
FIG. 1 is a perspective view of a package, according to the invention.

Looking to FIG. 1, a package 10 in accordance with the present invention includes a support member or tray 12 having side walls 14 and a base 16 defining an inner cavity 18 for receiving product 20. A peripheral flange 22 is defined about the upper portions of side walls 14. Multilayer web 26 is sealed to the tray at the flange 22.

Figure 2:
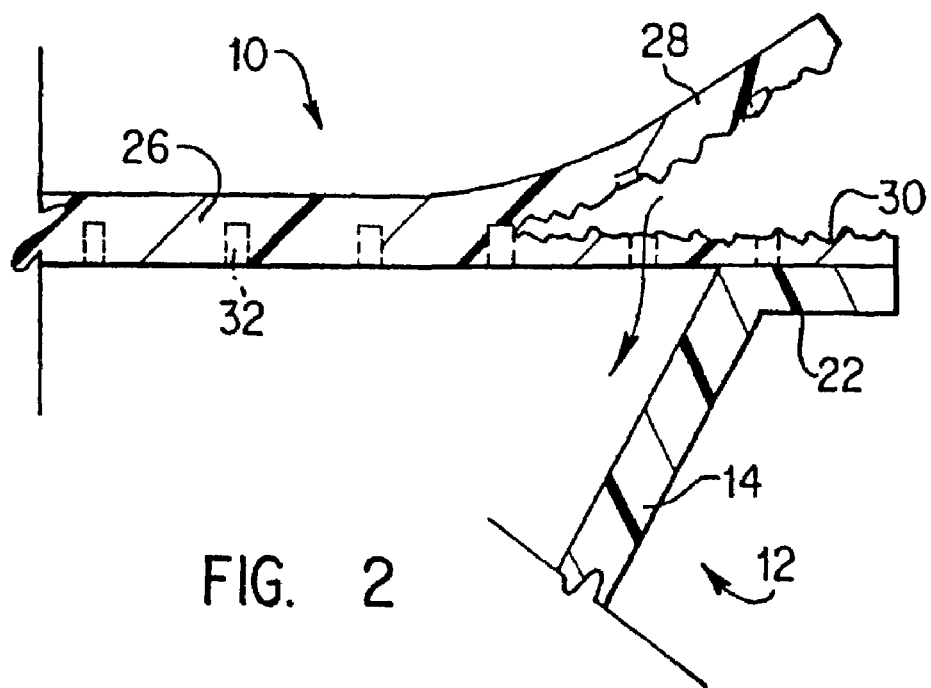
FIG. 2 is a partial cross-sectional view of the package of FIG. 1.

FIG. 2 is a cross-sectional view of the package 10 of FIG. 1 including tray 12 with web 26 sealed to flange 22. For the present embodiment, web 26 is a single, coextruded multilayer film which may be delaminated into impermeable and permeable portions. Films which may be so delaminated are well known in the art and are formed by coextruding a multilayer film which includes two layers immediately adjacent to each other and which demonstrate a weak force of adhesion therebetween. Preferred bond strength equate to peel forces to separate these adjacent layers of from about 0.02 to about 0.05 lbs. Thus, web 26 delaminates into an upper impermeable portion 28 and a lower permeable portion 30, as is shown.

Web 26 has defined therein partial perforations 32 which extend through the permeable portion of the film. Upon delamination it is seen that the impermeable portion 28 is substantially free of such perforations. Accordingly, when partially perforating a film or web for use in the present inventive package it is necessary to know the extent and thickness of the permeable and impermeable layers contained therein and for the perforations to extend through the permeable layers but not, to any material extent, through the impermeable layers. That is, the perforations may extend partially, to a slight degree, into the impermeable layers but may not interfere with the gas barrier properties of the impermeable portion of the multilayer film. Also included are perforations which extend substantially but not necessarily completely through the permeable portion, commonly referred to as blind perforations.

Thus, when impermeable portion 28 is peeled away, perforations 32 defined within the remaining permeable portion 30 allow for a rapid exchange of gases and consequent blooming of the packaged meat product, as is shown. It should be noted that web 26 is a multilayer film which delaminates into permeable and impermeable portions to uncover the permeable portion and enhance the flow of gases into and out of the package. It is also within the scope of the present invention, although less preferred, to provide a multilayer film which delaminates into two impermeable portions, one that is directly sealed to the support member having perforations. Such alternative is less preferred because the inherent permeability of a permeable film portion also aids in gas exchange. More importantly, in areas of intimate film to meat contact an impermeable perforated film portion will preclude bloom of the meat except in the specific areas of perforation, thus resulting in a non-bloomed area containing dotted areas of bloom. And, because of the expense involved in coextruding two gas barrier layers in a single multilayer film when one will merely be perforated to render it permeable-anyway, it is generally preferred that the perforated portion is permeable.

Figure 3:
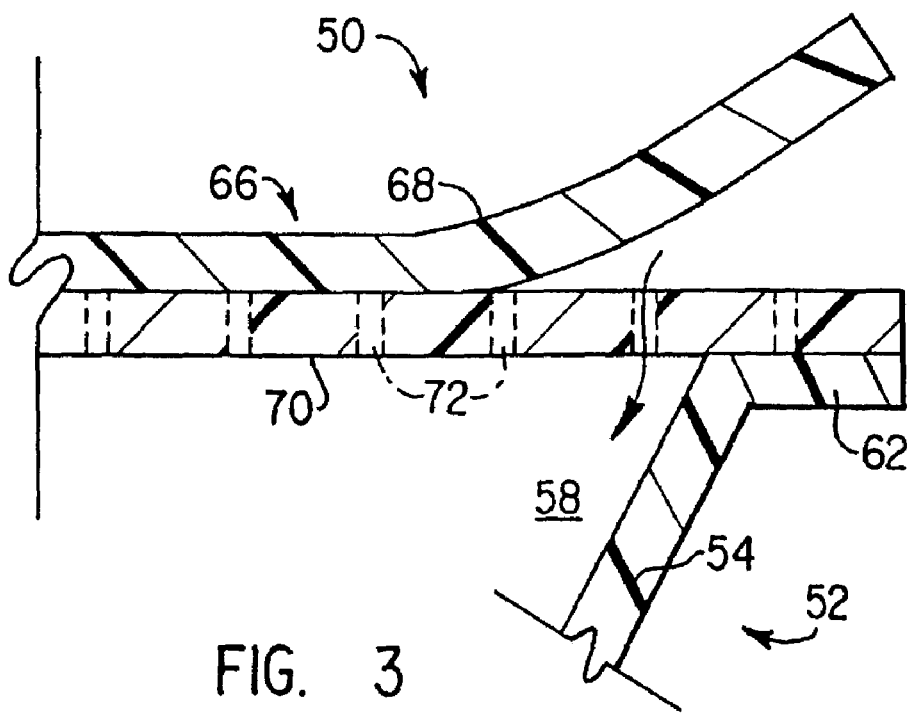
FIG. 3 is a partial cross-sectional view of another package in accordance with the present invention.

FIG. 3 is directed to a package 50 which is similar in operation but somewhat different in manufacture from that of package 10 of FIGS. 1 and 2, above, Hereagain package 50 includes tray 52 having side walls 54 and a base, not shown, which defines a cavity 58 for receiving a product. A peripheral flange 62 is defined about the upper portions of side walls 54. Multilayer web 66 is sealed to the tray at flange 62. For the present embodiment, web 66 is a coextruded, multilayer film or laminate of a nonperforated impermeable film 68 and a film 70 which includes perforations 72 defined therein. As with the single film embodiment discussed above, it is preferred that film 70 is a permeable film because, although the perforations defined therethrough greatly increase the gas transmission rate of the film, such inherent permeability aids in gas exchange and blooming will be hindered in areas of intimate film to meat contact. However, a nonpermeable film which is perforated to render it permeable is also within the scope of the present invention. As is shown in FIG. 3, nonperforated film 68 is peeled away to reveal perforated film 70 for a rapid exchange of gases and blooming of the packaged meat at retail.

Figure 4:
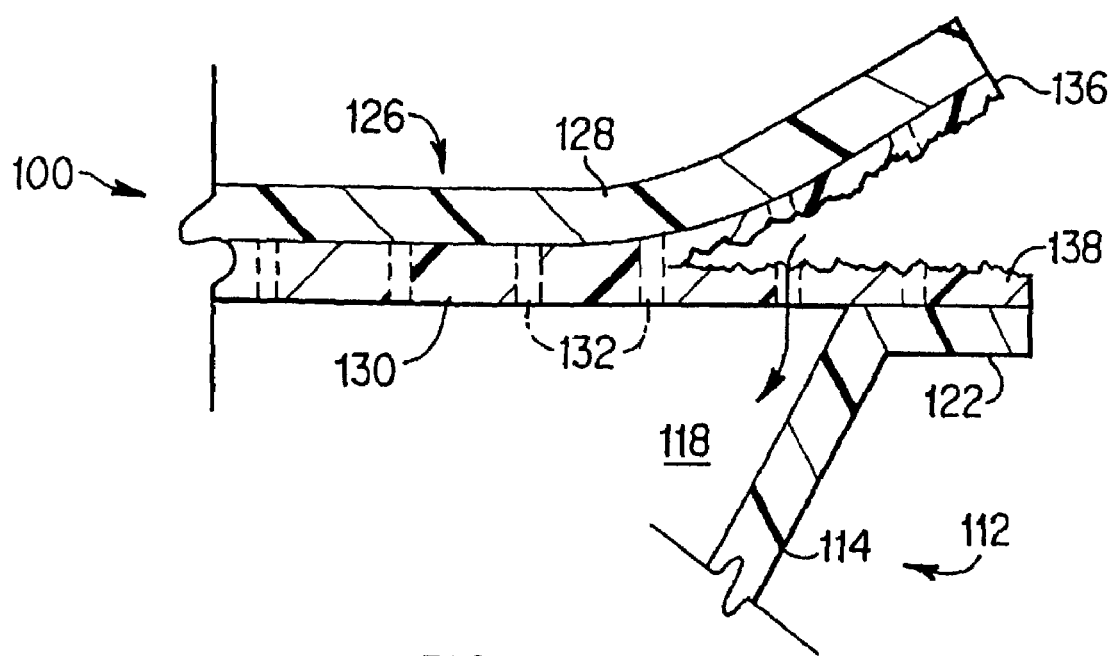
FIG. 4 is a partial cross-sectional view of yet another package in accordance with the present invention.

FIG. 4 illustrates yet another package 100 in accordance with the present invention which includes a support member or tray 112 having side walls 114 and a base defining an inner cavity 118 for receiving product. A peripheral flange 122 is defined about the upper portions of side walls 114. Multilayer web 126 is sealed to the tray at the flange 122. For the present embodiment, web 126 is a laminate of impermeable film 128 and multilayer film 130 having perforations 132 defined therein. Hereagain, multilayer film 130 is capable of delaminating into two separate film portions. However, for purposes of the present embodiment it is necessary that the force require to delaminate film 130 into two separate film portions is less than the force required to delaminate impermeable film 128 from the upper surface of multilayer film 130. That is, film 130 is formed by coextrusion, is perforated, and is then laminated to impermeable film 128. However, unlike laminate 66 above, impermeable film 128 may not be readily peeled from film 130. Rather, the bond strength between film 128 and multilayer film 130 is greater than the interlayer strength of film 130 such that any attempt to remove film 128 results in the cohesive failure and interlayer delamination of film 130 into two separate film portions. Thus, upper portion 136 remains bonded to impermeable film 128 and lower portion 138 remains sealed to tray flange 122.

As with the webs discussed with respect to the embodiments set forth above, the permeability of film 130 prior to its perforation is somewhat optional and may encompass a variety of combinations. Most preferably multilayer film 130 is a permeable multilayer film which is perforated, laminated to impermeable film 128 and, upon any attempt at removal of film 128, delaminates into two film portions, one of which remains bonded to film 128 and the other of which remains sealed to tray 112 enclosing the packaged meat product. Therefore, it should be understood that FIG. 4 illustrates the separation of portions 136 and 138 as shown but that film 130 being multilayer can be substantially separable right at the layer-layer interface as well. However, it is also within the scope of the present invention to provide a multilayer impermeable film which delaminates into permeable and impermeable portions. Such multilayer film is perforated, laminated to impermeable film 128, preferably with the impermeable portion being immediately adjacent to impermeable film 128 and the permeable portion being sealed to tray 112, and, upon any attempt at removal of film 128, delaminates into two film portions, the impermeable portion remaining bonded to film 128 and the permeable portion remaining sealed to tray 112. Because the film 130 is perforated all the way through it is also within the scope of the invention, although less preferred, to laminate film 130 to impermeable film 128 with the permeable portion being immediately adjacent to film 128 and the impermeable portion being sealed to tray 112. Similarly, it is also within the scope of the present invention to employ a multilayer film which delaminates into two impermeable portions such that the film portion which remains sealed to tray 112 upon removal of film 128 is a perforated impermeable film, which is, of course, rendered permeable by its perforations. As above, it is preferred that the remaining film portion 138 is permeable because, although the perforations defined therethrough greatly increase the gas transmission rate of the film, such inherent permeability aids in gas exchange and because of potential preclusion of bloom in areas of intimate film to meat contact.

Figure 5:
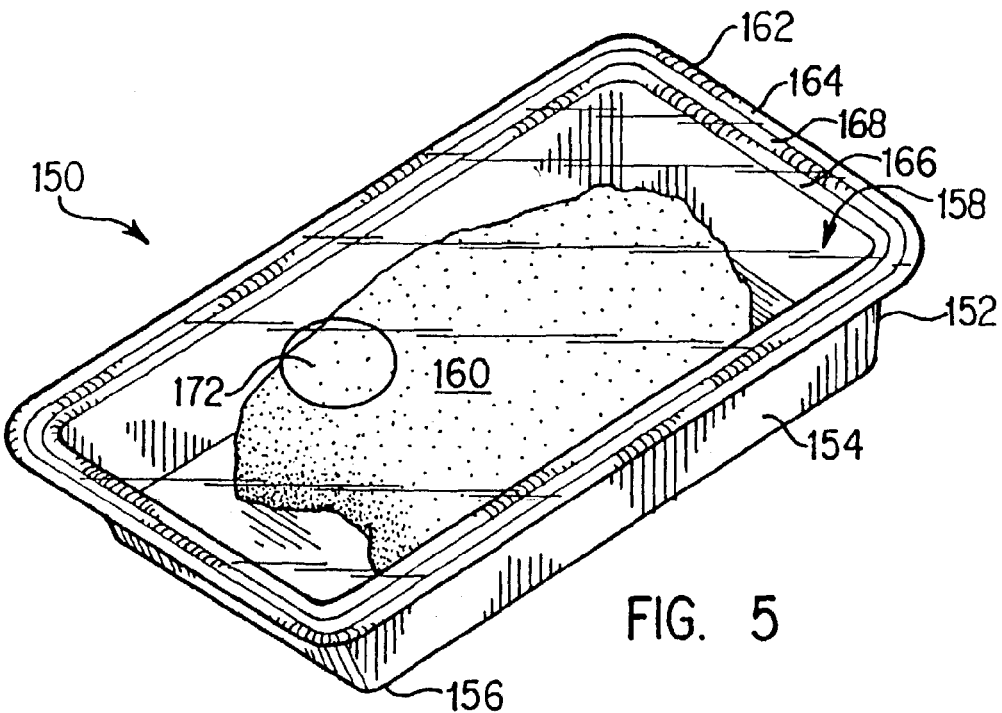
FIG. 5 is a perspective view of a further package in accordance with the present invention.

Turning now to other means for exchanging gases which may be defined within the first film of the present invention, FIG. 5 illustrates a package 150 which includes a tray 152 having side walls 154 and a base 156 defining a cavity 158 for receiving a product 160. As will be discussed in greater detail below, for purposes of the present embodiment, it is preferred that a dual flange 162 is employed which includes outer flange portion 164 and inner flange portion 166 which are separated by depression 168.

Figure 6:
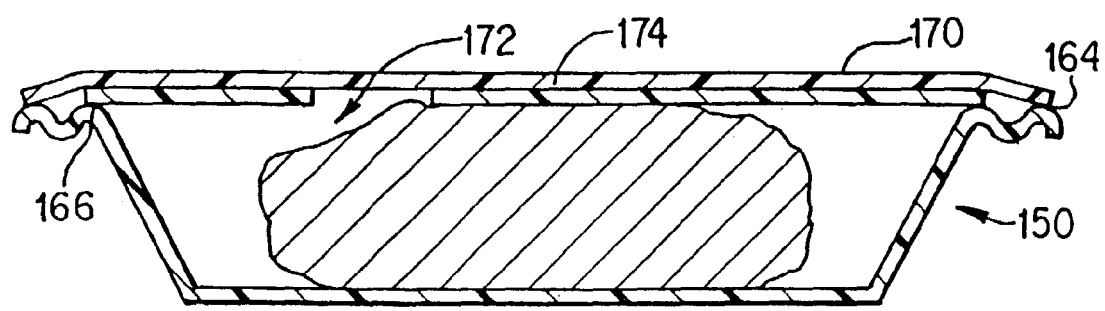
FIG. 6 is a cross-sectional view of the package of FIG. 5.

As is shown better in the cross-sectional view of FIG. 6, a first film 170 is sealed to inner flange portion 166 and includes an enlarged opening 172 defined therein. The opening 172 is of sufficient dimensions to impart of gas transmission rate of at least 50,000 cc/m$^2$/24 hrs./atm. at 73° F., and more preferably at least about 75,000 cc/m$^2$/24 hrs./atm. at 73° F., to the film. For purposes of the present embodiment it is preferred that film 170 is comprised of a gas permeable film, as will be shown below.

Figure 6A:
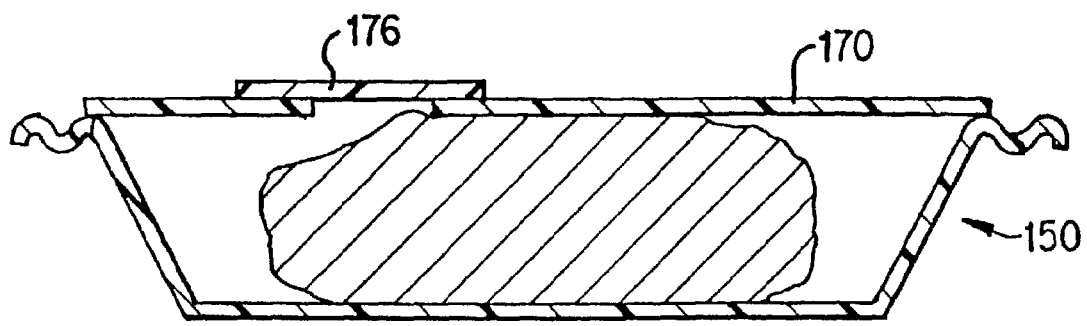
FIG. 6A is a cross-sectional view of the package of FIG. 5 following removal of the impermeable web and application of the patch.

Impermeable film 174 encloses film 170 and opening 172 defined therein and is sealed to outer flange portion 164. Preferably, the seal formed between film 174 and outer flange portion 164 is such that film 174 may be easily peeled away at retail. Thus, upon removal of impermeable film 174, the enlarged opening 172 defined in film 170 allows for a rapid exchange of gases out of and into the package and a concurrent blooming of the packaged meat product. Following such gas exchange opening 172 is enclosed with a patch 176 as is shown in FIG. 6A. Alternately, opening 172 can be formed subsequent to removal of film 174 and patch 176 then applied. Such patch may be permeable or impermeable. Generally, it is preferred that either film 170 or patch 176 or both are permeable to allow for a continued gas exchange during retail display. Also, a single impermeable web having a patch covering the hole is within the scope of the invention. If film 170 is gas impermeable, then the patch 176 preferably comprises a permeable material. However, since the opening 172 and its patch 176 define only a relatively small percent of the surface area of film 170, a preferred option is for film 170 to be permeable. Then patch 176 may be either permeable or impermeable, but need not serve as the sole means of gas exchange during retail display. Furthermore, rather than giving the appearance that something went wrong and the package was "patched up" for retail display, it is preferred that the patch serve as all or a portion of a label identifying the product.

Although a single enlarged opening is illustrated, two or more smaller openings may also be employed so long as they impart sufficient gas flux capability to the film. However, it is generally preferred that multiple openings be grouped together such that they may be enclosed by a single patch or label.

Figure 7:
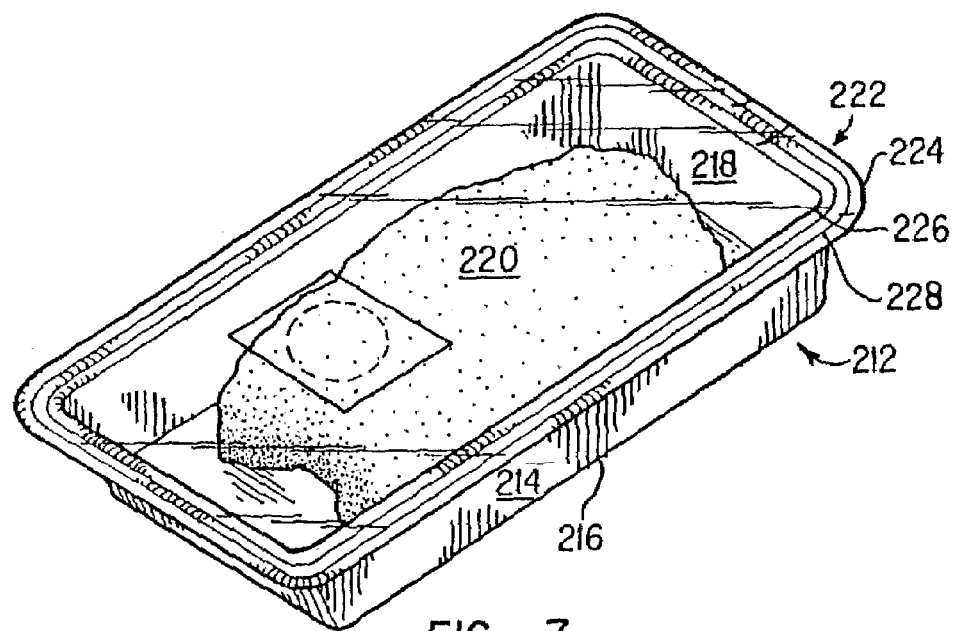
FIG. 7 is a perspective view of a still further package in accordance with the present invention.

FIG. 7 illustrates yet a further embodiment of the present invention in which a package 200 includes a tray 212 with side walls 214 and a base 216 defining a cavity 218 for receiving a product 220. For purposes of the present embodiment it is preferred that a dual flange 222 is employed which includes outer flange portion 224, inner flange portion 226 and depression 228 separating the two.

Figure 8:
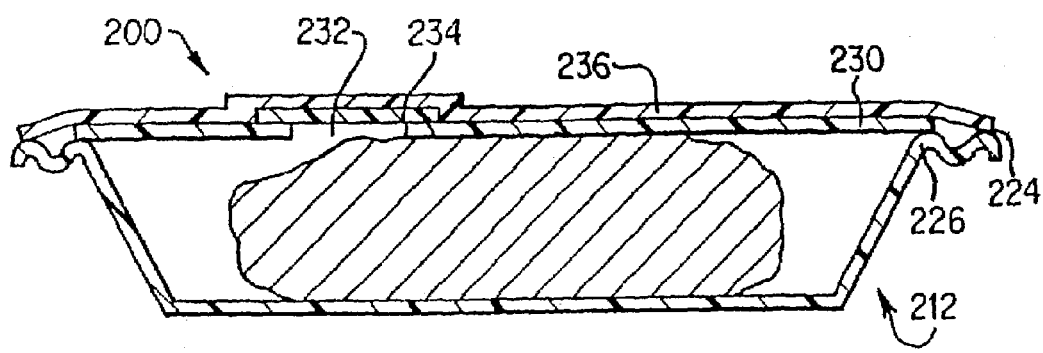
FIG. 8 is a cross-sectional view of the package of FIG. 7.

As is better shown in the cross-sectional view of FIG. 8, a first film 230 encloses the product and is sealed to the tray 212 at inner flange portion 226. An enlarged opening 232 is defined within the first film and a second film or patch 234 is sealed to the first film enclosing opening 232. For all the embodiments of a permeable patch or a film covering a hole in a first film, the patch/film permeable material can comprise any permeable polymeric material compatible with the web it is sealed to. It can comprise, for example, polyethylene or any of a variety of ethylene copolymers including, for example, ethylene vinyl acetate, ethylene acrylate copolymers, ethylene acrylic acid copolymers including metal neutralized salts thereof, and ethylene alpha-olefin copolymers. Most preferred is a patch/film exhibiting a gas transmission rate of at least about 50,000 cc/m$^2$/24 hrs./atm. at 73° F., more preferably at least about 75,000 cc/m$^2$/24 hrs./atm. at 73° F. Examples of such include spun-bonded polyolefin or polyester materials, such as Tyvek manufactured by DuPont and other microporous materials which are well known in the art. Impermeable film 236 encloses the first film 230 and patch 234 and is sealed to the outer flange portion 224 of tray 212. Preferably, the seal between impermeable film 236 and outer flange portion 224 is such that film 236 may be peeled away from the package leaving first film 230 and patch 234 enclosing the product. The exceptionally high gas transmissibility of patch 234 provides for a rapid exchange of gases and blooming of the package meat product. Although it is preferred that film 230 is permeable, an impermeable film may be employed so long as the enlarged opening and highly permeable patch are sufficiently large to allow for a free flow of gases into and out of the package.

Thus package 200 is formed by sealing a first film 230 to inner flange portion 226 of tray 212 which contains product 220 therein. An enlarged opening is formed and is covered with the highly permeable second film or patch 234. Impermeable film 236 is then sealed to outer flange portion 224. Optionally, enlarged opening 232 may be formed prior to the application and sealing of film 230 to the tray. If such is the case, second film or patch 234 may also be sealed to the first film 230 prior to its application and sealing to tray 212.

Figure 9:
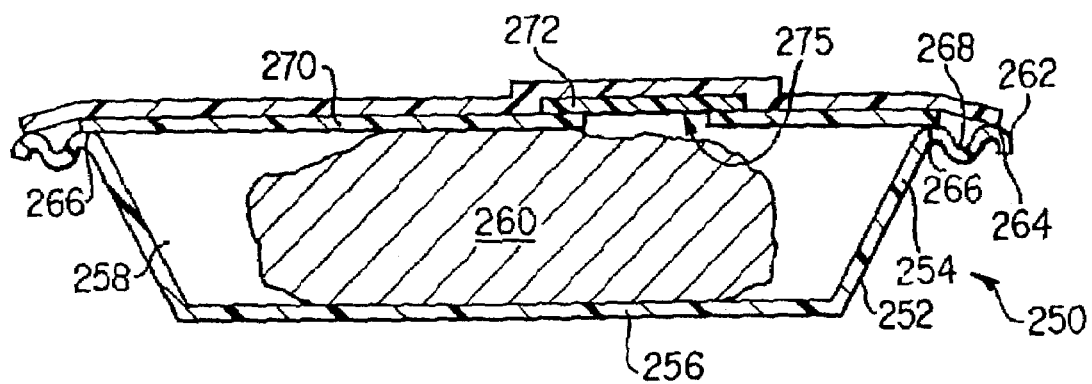
FIG. 9 is a cross-sectional view a further embodiment of the present invention.

An inventive package which is similar in operation but different in appearance and manufacture is illustrated in FIG. 9. Package 250 includes tray 252 which has side walls 254 and base 256 defining cavity 258 for receiving product 260. Dual flange 262 includes outer flange portion 264 and inner flange portion 266 separated by depression 268. A first film 270 is sealed to inner flange portion 266. A second film 272, preferably a continuous strip, is sealed to first film 270. As with the patch/film, discussed above, the present second film 272 is preferably comprised of a permeable material as described above, such as Tyvek. Impermeable film 274 encloses the first and second films and is sealed to tray 252 at outer flange portion 264. Impermeable film 274 may be peelably removed to expose the first and second films. The highly permeable nature of second film 272 provides for a rapid exchange of gases out of and into the package and an immediate bloom of the packaged meat product.

Preferably, a series of perforations or slits 275 is introduced into film 270 underlying film 272, preferably after film 272 is sealed thereto, to augment the free flow of gases into and out of the package. Rather than being applied as a patch, the second film 272 of the present embodiment is preferably sealed to the first film prior to application and sealing of the first film to the tray.

For all embodiments of the present invention it should be generally noted that dual flange trays are preferred whenever two separate webs must be sealed to a single tray. However, a conventional, single flange tray may be employed when a precise means is available for sealing the first film to an inner portion of the single flange and for subsequently sealing the impermeable film to an outer portion of the single flange. That is, the primary reason a dual flange is preferred for use as the tray of the present invention is that it facilities the automated sealing of two separate webs to the flange. A second circumstance under which a single flange may be employed as the tray for dual-web embodiments of the present inventive package is when an adequate, peelable seal may be made between the impermeable film and the first film. Rather than sealing the impermeable film directly to the tray, it is possible, with the proper selection of film components, to form a seal directly to the first film which may be peeled away without disturbing the seal between the first film and the tray flange.

The permeable film or web of the present invention is an oxygen permeable or non-barrier film or skin which may be a formable or stretchable material. Typical polymeric materials for the present permeable film may include any material which may be securely sealed and bonded to the support member, such as polyethylene or any of a variety of ethylene copolymers including, for example, ethylene vinyl acetate, ethylene acrylate copolymers, ethylene acrylic acid copolymers including metal neutralized salts thereof, and ethylene alpha-olefin copolymers. Such ethylene alpha-olefins may be heterogeneous or homogeneous in nature. That is, ethylene alpha-olefins which have been formed by conventional Zeigler-Natta catalysis and are heterogeneous in nature, such as linear low density polyethylene (LLDPE), are within the scope of the present invention as well as such copolymers which are formed by single site catalysis, such as any of a variety of forms of metallocene catalyst technology, and are homogeneous in nature are also within the scope of the present invention. A preferred permeable film for use in accordance with the present invention is a symmetrical, five layer oriented film having the structure:

EVA/LLDPE/EVA/LLDPE/EVA although a wide variety of permeable films may be employed.

The impermeable film or web of the present invention may be any suitable barrier layer, film or laminate which is substantially impermeable to gas such as oxygen so that a fresh meat product contained in a vacuum or other low oxygen atmosphere possesses an enhanced shelf life over a package without the barrier layer. Suitable polymeric materials having gas barrier properties for use in the present invention include ethylene vinyl alcohol copolymers, vinylidene chloride copolymers (PVDC) such as vinylidene chloride vinyl chloride or vinylidene chloride methyl acrylate. Laminates of a sealable film and a barrier structure which includes a barrier layer and a tough, non-forming material such as a biaxially oriented nylon or biaxially oriented polyester are especially preferred for use as the impermeable lidding of the present inventive packages. A preferred impermeable web has the structure:

biax nylon/PVDC//EVA/LLDPE/seal wherein the double slashes (//) indicate adhesive lamination of the two webs, although a variety of laminates and multilayer films may be employed as the impermeable web of the present invention.

Generally, the films or webs which may be employed in accordance with the present invention may be monolayer or multilayer. Multilayer films may be employed when all of the properties required of the film cannot be achieved by a single polymeric component or a blend of polymers in a single layer. For example, an impermeable film to be sealed to a tray in all likelihood will comprise a multilayer film because several properties are needed including peelable sealability, oxygen barrier and impact properties, and outer abuse properties. Thus, the film employed will most likely contain three layers at a minimum: a seal layer, a barrier layer and an outer abuse layer. Further internal layers such as adhesive layers and bulk layers may also be included. Laminates of sealable films and nonforming materials such as biaxially oriented polyester or biaxially oriented nylon are also within the scope of the present invention and are widely recognized as superior lidstocks for tray-type packages.

For all embodiments, the tray must be impermeable, but may be chosen from a variety of commercially available designs and compositions. That is, the tray may be formed of a rigid solid polymer, a barrier sealant coated polymer, a barrier sealant coated foamed polymer, or a barrier sealant coated pulp or paperboard tray. If foamed, a barrier film must be included, at least, on the inner surface of the tray in order to prevent outgassing of residual gases into the package.

Generally, the films employed in the present invention may be multilayer or monolayer, although, of course, those films defined as delaminatable, multilayer films must include at least two layers. Typically, the films employed will have two or more layers in order to incorporate a variety of properties, such as, for example, sealability, gas impermeability and toughness, into a single film.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A package for a product, comprising:
a product;
a support member supporting the product;
a first, substantially gas-impermeable film sealed to said support member to enclose the product between said support member and said first film, said first film having at least one opening therein;
a patch sealed to said first film such that said patch covers said at least one opening in said first film, said patch having a gas transmission rate of at least about 50,000 cc/m²/24 hrs./atm. at 73° F.; and a second, substantially gas-impermeable film that encloses said patch, whereby, removal of said second, substantially gas-impermeable film allows for a flow of gases through said patch and said at least one opening, into and out of the package.

2. A package as set forth in claim 1, wherein said at least one opening comprises a hole in said first film.

3. A package as set forth in claim 1, wherein said at least one opening comprises a series of perforations or slits in said first film.

4. A package as set forth in claim 1, wherein said patch comprises a microporous material.

5. A package as set forth in claim 1, wherein said second film is sealed directly to said first film.

6. A package as set forth in claim 1, wherein said first film comprises at least one material selected from ethylene vinyl alcohol copolymer, vinylidene chloride copolymer, nylon and polyester.

7. A package as set forth in claim 1, wherein said second film comprises at least one material selected from ethylene vinyl alcohol copolymer, vinylidene chloride copolymer, nylon and polyester.

8. A package as set forth in claim 4, wherein said microporous material comprises spun-bonded polyolefin or spun-bonded polyester.

9. A web, comprising:
a first, substantially gas-impermeable film having at least one opening therein;
a patch sealed to said first film such that said patch covers said at least one opening in said first film, said patch having a gas transmission rate of at least about 50,000 cc/m²/24 hrs./atm. at 73° F.; and
a second, substantially gas-impermeable film that encloses said patch and is sealed to said first film,
whereby, removal of said second, substantially gas-impermeable film allows for a flow of gases through said patch and said at least one opening.

10. A web as set forth in claim 9, wherein said at least one opening comprises a hole in said first film.

11. A web as set forth in claim 9, wherein said at least one opening comprises a series of perforations or slits in said first film.

12. A web as set forth in claim 9, wherein said patch comprises a microporous material.

13. A web as set forth in claim 9, wherein said first film comprises at least one material selected from ethylene vinyl alcohol copolymer, vinylidene chloride copolymer, nylon and polyester.

14. A web as set forth in claim 9, wherein said second film comprises at least one material selected from ethylene vinyl alcohol copolymer, vinylidene chloride copolymer, nylon and polyester.

15. A web as set forth in claim 12, wherein said microporous material comprises spun-bonded polyolefin or spun-bonded polyester.

\* \* \* \* \*